United States Patent Office 3,585,219
Patented June 15, 1971

3,585,219
PROCESS FOR THE PRODUCTION OF SULFONATED PRIMARY AMINOANTHRAQUINONE BY CONVERSION OF AN N-CYCLOHEXYL-AMINO-ANTHRAQUINONE
Willy Braun, Heidelberg, and Manfred Ruske, Ludwigshafen (Rhine), Germany, assignors to Badische Anilin- & Soda-Fabrik Aktiengesellschaft, Ludwigshafen (Rhine), Germany
No Drawing. Continuation-in-part of application Ser. No. 388,265, Aug. 7, 1964. This application Feb. 13, 1967, Ser. No. 615,359
Claims priority, application Germany, Aug. 13, 1963, B 73,096
Int. Cl. C09b 1/24
U.S. Cl. 260—371  5 Claims

ABSTRACT OF THE DISCLOSURE

This specification discloses the production of sulfonated aminoanthraquinones by the action of oleum on N-cyclohexylaminoanthraquinones at a temperature of from 50 to 160° C. Aminoanthraquinones are valuable intermediates for the production of dyestuffs.

---

This application is a continuation-in-part of application S.N. 388,265, filed Aug. 7, 1964, now issued as U.S. Pat. No. 3,342,831.

This invention relates to a new process for the manufacture of sulfonated aminoanthraquinones some of which have not hitherto been available or have had to be prepared by very complicated methods.

It has long been known that in the thermal treatment of hydrohalides of secondary amines primary amines may be obtained. This method has not achieved practical importance on account of the irregular course of the reaction. Moreover it is known that N-substituted sulfonamides, particularly N-substituted p-toluenesulfonamides, can be split into amines by hydrolysis with strong acids, for example sulfuric acid or hydrochloric acid. This method is not useful unless the sulfonamides are readily available.

It is an object of the invention to provide a new process for the production of sulfonated aminoanthraquinones. It is another object of the invention to provide a process for the production of sulfonated aminoanthraquinones which uses readily obtainable initial materials. It is a further object of the invention to provide a process for the production of sulfonated aminoanthraquinones that have not hitherto been accessible or that have been difficult to produce. These and other objects of the invention are achieved by allowing liquid oleum of a concentration of at least 8 percent by weight of free sulfur trioxide to act on a N-cyclohexyl aminoanthraquinone which may be unsubstituted or substituted. Nitrile groups or amdio groups in the aminoanthraquinone may be wholly or partly saponified.

This method has several advantages over that using arylsulfonamides. Firstly cyclohexylamino compounds are not, like arylsulfonamido compounds, accessible only from halogen compounds but also from other compounds having negative substituents, as for example sulfonic acids or nitro compounds, by their reaction with cyclohexylamine, so that according to the new amine synthesis, a far greater number of initial materials may be converted into the corresponding amines.

A further considerable advantage is that in compounds having a plurality of negative substituents of equal reactivity, as for example 1,4- and 1,5-dichloroanthraquinone, only one of the groups may if desired be reacted with cyclohexylamine so that after cleavage aminohalogen compounds or aminosulfonic acids are obtained. This definite exchange of only one of the chlorine atoms of dichloroanthraquinones is not possible with toluene-sulfonamide because usually, besides unchanged initial material, a mixture of monotosylamino and ditosylamino compounds is formed, the aminohalogen compounds being obtained usually in yields of less than 50%.

Suitable initial materials are secondary cyclohexyl amines which contain a substituted or unsubstituted anthraquinone radical on the nitrogen atom. The substituents may be inert, for example halogen atoms, especially chlorine and/or bromine atoms, carboxyl groups, sulfonic acid groups, amino groups, or alkylamino, alkyl, alkoxy, acetyl, benzoyl, thiophenyl or benzoxazolyl radicals. It is also possible to use substituents which undergo change under the reaction conditions. For example, a nitrile group or a carboxylic amide group may be saponified. If reactive chlorine atoms are contained in the anthraquinone radical, those may also be hydrolyzed to hydroxyl groups.

Suitable initial materials are accordingly:

1-cyclohexylamino-anthraquinone-5-sulfonic acid,
1-cyclohexylaminoanthraquinone-6-sulfonic acid,
1-cyclohexylamino-4-chloroanthraquinone,
1-cyclohexylamino-4-bromanthraquinone,
1-cyclohexylamino-2-cyanoanthraquinone,
1-cyclohexylaminoanthraquinone-2-carboxylic amide,
1-amino-2-cyano-4-cyclohexylaminoanthraquinone,
1-amino-2-carboxylic-amido-4-cyclohexylaminoanthraquinone,
1,5-dicyclohexylaminoanthraquinone,
1-cyclohexylamino-2-methoxyanthraquinone,
1-amino-2-methoxy-4-cyclohexylaminoanthraquinone,
1-cyclohexylamino-4-chloroanthraquinone-6-sulfonic acid,
1-cyclohexylamino-4-chloroanthraquinone-6-carboxylic acid,
1-amino-2-acetyl-4-cyclohexylaminoanthraquinone,
1-cyclohexylamino-4-chloro-6-benzoxazoloanthraquinone,
1-cyclohexylamino-4-chloro-6-benzoylanthraquinone,
1-cyclohexylamino-4-thiophenylanthraquinone,
1,5-dicyclohexylamino-4,8-dithiophenylanthraquinone,
1,5-dicyclohexylamino-4,8-dibromoanthraquinone,
1-cyclohexylamino-5-chloroanthraquinone and so on. In all of these initial compounds, it will be noted that the cyclohexylamino group is substituted in α-position.

The cyclohexylaminoanthraquinones used as initial materials are as a rule easily accessible from appropriately substituted anthraquinone halogen, nitro or sulfonic acid compounds by reaction with cyclohexylamine, for example by heating by conventional methods; when two halogen atoms or sulfonic acid groups are present in the molecule, monocyclohexylamino-substituted or dicyclohexylamino-substituted anthraquinones may be obtained depending on the relative proportions used.

For example the production of cyclohexylamino compounds from haloanthraquinones is advantageously carried out in organic solvents, for example chlorobenzene, dichlorobenzene or nitrobenzene, or in cyclohexylamine itself, if necessary in the presence of acid-binding agents, for example alkali metal carbonates, and catalysts, for example copper or its oxides or salts. Except when cyclohexylamine serves as the solvent, one to three gram-moles of cyclohexylamine is used for each gram-atom of halogen, or in the case of partial exchange of one of two halogen atoms present, only 1.0 to 1.5 gram-moles of cyclohexylamine for each gram-mole of haloanthraquinone. The reaction temperatures depend on the excess of cyclohexylamine and are in general from 120° to 180° C. If the initial materials are soluble in water, they are advantageously reacted in cyclohexylamine or in aqueous cyclohexylamine at the boiling temperature or in a pressure vessel at up to 200° C. When exchanging a sulfonic acid group in an anthraquinone, which may be present as a metal salt, e.g. a sodium or potassium salt, for a cyclohexylamino radical, the components may be reacted in aqueous solution in about equivalent amounts, and when exchanging all the sulfonic acid groups, also with an excess of cyclohexylamine, at elevated temperature, preferably at 120° to 190° C., if necessary under pressure. Adding an oxidizing agent, for example, m-nitrobenzenesulfonic acid, is often advantageous. Exchange of the nitro groups in aromatic compounds for a cyclohexylamino group may in general be carried out in cyclohexylamine or aqueous cyclohexylamine; the reaction temperature is in general from 50° C. to the boiling point of the reaction mixture.

In the preferred cyclohexylaminoanthraquinones, 1 or 2 cyclohexylamine groups are in $\alpha$-position and up to 4 other substituents may be present in the molecule. If alkyl groups are present either as substituents or in alkylamino groups and/or if alkoxy groups are contained in the aminoanthraquinones as substituents, the alkyl and alkoxy groups contain from 1 to 4 carbon atoms.

Oleum with for example of from 8 up to 39% or even up to 60 or to 80% by weight free sulfur trioxide is a suitable reagent. It is preferred to use oleum with a content of 23 to 65% by weight free sulfur trioxide. The oleum shall be liquid under the reaction conditions applied.

To split the cyclohexylaminoanthraquinone compounds and to sulfonate it, they are mixed with the liquid oleum and if necessary heated, the cyclohexylaminoanthraquinone to be split and the liquid oleum being usually employed in a ratio from 1:1 to 1:30, particularly from 1:5 to 1:15. Lower concentrations of the amine to be split in the liquid oleum may in most cases be used without disadvantage. The reaction temperature and the reaction period depend on the initial material. In general, the reaction temperature is from about 50° to 160° C. and the reaction period is from about one to fifteen hours. It is advantageous to determine the most favorable conditions by simple preliminary experiment. Usually the process is carried out at atmospheric pressure, but naturally superatmospheric or subatmospheric pressures may also be used.

Isolation of the sulfonated primary aminoanthraquinones from the reaction mixture is carried out by conventional methods. The following procedure is advantageous: the oleum solution has such an amount of ice or water added to it in portions that the sulfonated aminoanthraquinone is substantially separated from the solution. Then it is separated and if necessary washed with sulfuric acid having a concentration in which the aminoanthraquinone is not substantially soluble and then with water. In many cases, however, it is possible to carry out precipitation direct with water and to suction filter the deposited amino compound, water-soluble compounds being prevented from dissolving if necessary by adding acid or salt.

The sulfonated aminoanthraquinones prepared according to this invention are either themselves dyes or intermediates for the production of dyes.

The invention is further illustrated by the following example. The parts specified in the example are parts by weight and the percentages are percentages by weight.

EXAMPLE 100 parts of 1-cyclohexylaminoanthraquinone-5-sulfonic acid is dissolved in 800 parts of 23% oleum with stirring, heated within two hours to 120° C. and kept at this temperature for about five to six hours. The solution is cooled, added to 1500 parts of ice and salted out with about 200 parts of sodium chloride. The sulfuric acid is washed out with saturated sodium chloride solution and dried. 89.5 parts of 1-aminoanthraquinone-2,5-disulfonic acid (90% of the theory) is present in the salt-containing residue. For $C_{14}H_9NO_8S_2$ (383), N/S calculated: 0.218, found: 0.218.

The 1-cyclohexylaminoanthraquinone-5-sulfonic acid is obtained by reaction of 1,5-anthraquinonedisulfonic acid or a metal salt thereof, e.g. a sodium or potassium salt, at 120 to 190° C. with cyclohexylamine in water in the presence of sodium m-nitrobenzenesulfonate.

We claim:
1. A process for the the production of sulfonated primary amines of the anthraquinone series by allowing oleum of a concentration of at least 8% by weight of free sulfur trioxide to act on an anthraquinone substituted at one or two $\alpha$-positions by the cyclohexylamino group and bearing up to four additional inert substituents selected from the class consisting of sulfonic acid, chlorine, bromine, carboxyl, amino, alkyl of 1 to 4 carbon atoms, alkylamino in which the alkyl is of 1 to 4 carbon atoms, alkoxy of 1 to 4 carbon atoms, acetyl, benzoyl and thiophenyl, at a temperature of from 50° C. to 160° C.

2. A process as claimed in claim 1 in which the molar ratio of the oleum to the secondary amine lies between 1:1 and 1:30.

3. A process as claimed in claim 1 wherein the oleum has a concentration of at least 8% up to about 80% by weight of free sulfur trioxide.

4. A process as claimed in claim 1 wherein the oleum has a concentration of about 23 to 65% by weight of free sulfur trioxide.

5. A process as claimed in claim 4 wherein the molar ratio of the oleum to the secondary amine lies between 1:1 and 1:15.

References Cited

UNITED STATES PATENTS

| | | | |
|---|---|---|---|
| 3,316,280 | 4/1967 | Vollmann et al. | 260—371X |
| 3,342,831 | 9/1967 | Braun et al. | 260—378X |

FOREIGN REFERENCES

| | | | |
|---|---|---|---|
| 903,590 | 8/1962 | Great Britain | 260—372 |
| 1,205,550 | 11/1965 | Germany | 260—371 |

LORRAINE A. WEINBERGER, Primary Examiner

E. J. SKELLY, Assistant Examiner

U.S. Cl. X.R.

260—307.5, 372, 373